(12) United States Patent
Vangal-Ramamurthy et al.

(10) Patent No.: US 8,180,487 B1
(45) Date of Patent: May 15, 2012

(54) CALIBRATED VISION BASED ROBOTIC SYSTEM

(75) Inventors: Jambunathan Vangal-Ramamurthy, San Jose, CA (US); Robert E. Foster, Ben Lomond, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 732 days.

(21) Appl. No.: 12/242,239

(22) Filed: Sep. 30, 2008

(51) Int. Cl.
*G05B 15/00* (2006.01)

(52) U.S. Cl. .......... 700/259; 700/85; 700/174; 700/245; 700/248; 700/254; 318/568.1; 318/568.11; 318/568.21; 318/567; 318/587; 436/164; 219/121.78; 73/862.041; 73/862.043; 702/189

(58) Field of Classification Search ............ 700/85, 700/174, 186, 192, 245, 248, 254, 258, 259, 700/262; 318/560, 567, 568.1, 568.11, 568.15, 318/568.21, 587; 73/862.041, 862.043; 29/720, 29/407.05; 600/424, 429; 606/1, 130; 414/275, 414/729; 219/121.78; 342/716; 436/164; 348/35; 74/490.1; 702/189; 473/1; 360/92.1
See application file for complete search history.

(56) References Cited

U.S. PATENT DOCUMENTS

| | | | |
|---|---|---|---|
| 3,007,097 A | 10/1961 | Shelley et al. | |
| 4,362,977 A | 12/1982 | Evans et al. | |
| 4,460,826 A | 7/1984 | Pryor | |
| 4,570,065 A | 2/1986 | Pryor | |
| 4,753,569 A | 6/1988 | Pryor | |
| 4,831,549 A | 5/1989 | Red et al. | |
| 4,908,777 A | 3/1990 | Wolfe | |
| 5,083,073 A | 1/1992 | Kato | |
| 5,706,408 A * | 1/1998 | Pryor | 700/259 |
| 5,821,993 A | 10/1998 | Robinson | |
| 6,044,308 A | 3/2000 | Huissoon | |
| 6,070,109 A | 5/2000 | McGee et al. | |
| 6,078,846 A * | 6/2000 | Greer et al. | 700/174 |
| 6,138,494 A | 10/2000 | Lee et al. | |
| 6,507,992 B1 * | 1/2003 | Jenkins et al. | 29/603.03 |
| 6,594,600 B1 | 7/2003 | Arnoul et al. | |
| 6,816,755 B2 | 11/2004 | Habibi et al. | |
| 6,852,007 B1 | 2/2005 | Gonzalez-Martin et al. | |
| 7,043,334 B2 | 5/2006 | Herrmann et al. | |
| 7,089,085 B2 | 8/2006 | Kim | |
| 7,233,841 B2 | 6/2007 | Sadighi et al. | |
| 2003/0124735 A1 | 7/2003 | Nanthakumar et al. | |
| 2009/0326712 A1 * | 12/2009 | Marx | 700/254 |

OTHER PUBLICATIONS

U.S. Appl. No. 11/289,922, filed Nov. 30, 2005, 32 pages.
Notice of Allowance dated Nov. 10, 2011 from U.S. Appl. No. 12/354,506, 26 pages.

* cited by examiner

*Primary Examiner* — James Trammell
*Assistant Examiner* — McDieunel Marc

(57) ABSTRACT

A method of calibrating a vision based robotic system. The method includes engaging a calibration pin with a robotic tool and moving the calibration pin to a calibration block that includes at least one set of optical sensors having an optical transmitter to transmit an optical beam and an optical receiver to receive the optical beam. Further, the transmitted optical beam includes a center point. The method further includes: moving the calibration pin to the center point of the transmitted optical beam; determining a calibration pin center position relative to the robotic tool; and commanding a machine vision assembly having a camera to capture an image of a plurality of camera reading points of the calibration block and to determine a camera center position.

26 Claims, 6 Drawing Sheets

CALIBRATED VISION BASED ROBOTIC SYSTEM

BACKGROUND OF THE INVENTION

The use of robotic systems in automated manufacturing has become increasingly important in high technology device manufacturing. Robots can often perform repeated tasks with precision and efficiency that is generally not achievable through the use of human labor. Further, robots can be used in environments where manufacturing techniques for picking, placing, and assembling very small components make the use of human labor undesirable.

For example, this is particularly important in disk drive manufacturing where misplaced components may result in scraping during the assembly process possibly contaminating the disk drive and resulting in disk drive failure. This is particularly true for small-form-factor disk drives that require very high accuracy assembly techniques.

Robots used in disk drive manufacturing by picking, placing, and assembling components are generally well known in the art. However, in present robotic disk drive manufacturing, components are picked and placed by a robot from a taught point using a gripper, which may be prone to error.

In order to ensure precise positioning of components moved by the robot, reference points or coordinates for a desired or predetermined position of the robot's end effector, such as a gripper, may be entered into a memory of a robot controller as part of a calibration procedure. Acquiring the reference coordinates generally involves jogging the gripper to predetermined positions through a manual procedure. Arrival of the robot's end effector, such as a gripper, at the predetermined position may be confirmed by manually observing the end effector position or by having the end effector trigger a sensor.

Typically the movement of the robot's end effector for calibration is done manually. An operator must observe the location of the end effector relative to an object or target within the processing system to estimate the position of the end effector.

Thus, although attempts to improve robot accuracy are presently being made, these present techniques are typically tedious, time-consuming, undesirably expensive, and often do not provide an acceptable level of accuracy. Unfortunately, for high technology device manufacturing, such as disk drive manufacturing, that requires very high accuracy to avoid scraping and contamination, these present techniques are not acceptable.

A need therefore exists for improved calibration techniques for vision based robotic systems.

DETAILED DESCRIPTION

In the following description, various embodiments of the invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known electrical structures, circuits, robotic tools, robotic devices, manufacturing devices, mechanical devices, methods, procedures, and components are not described in detail, or are shown in block diagram form, in order not to obscure the present invention. Furthermore, the present invention will be described in particular embodiments but may be implemented in other types of hardware, software, firmware, etc., or combinations thereof.

Figure 1:
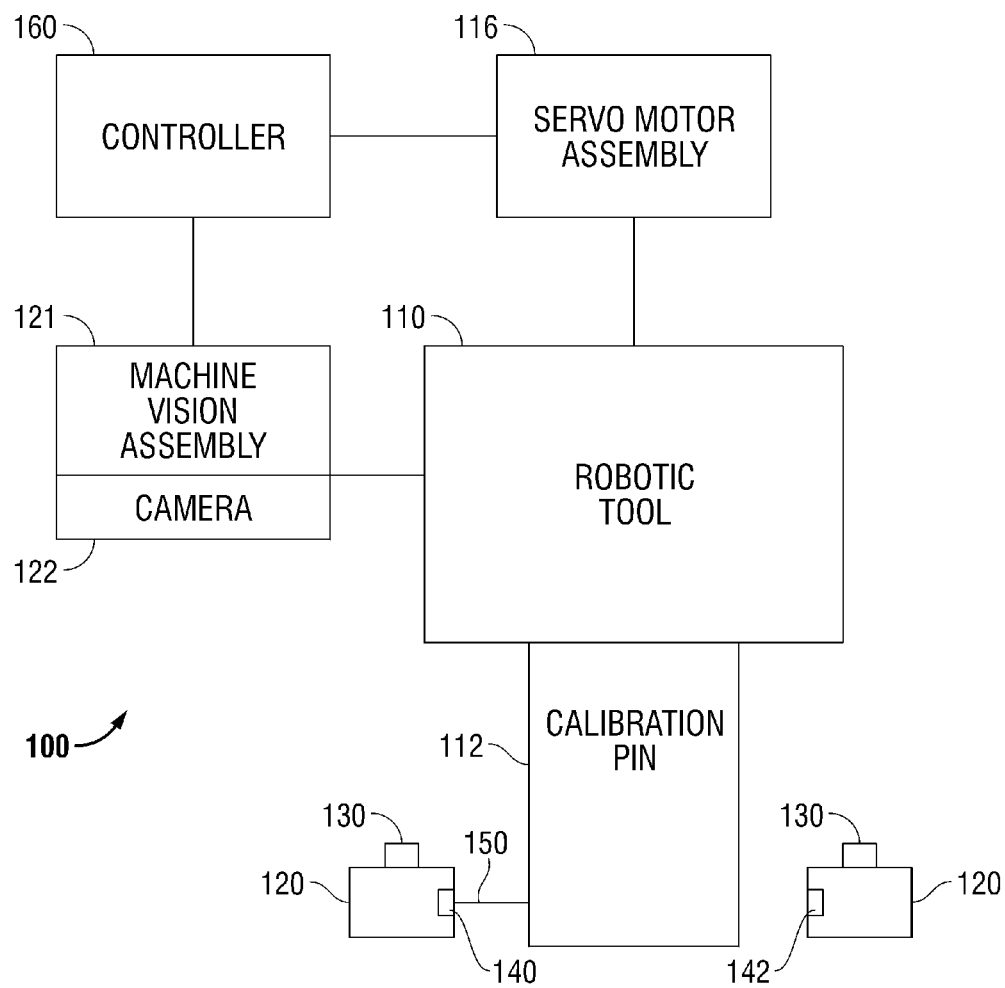
FIG. 1 shows a simplified block diagram of a calibrated vision based robotic system, according to one embodiment of the invention.

FIG. 1 shows a simplified block diagram of a calibrated vision based robotic system 100, according to one embodiment of the invention. Calibrated vision based robotic system 100 includes a robotic tool 110 that engages a calibration pin 112. A servo motor assembly 116 is coupled to robotic tool 110 and a controller 160. Servo motor assembly 116 is configured to move robotic tool 110. A machine vision assembly 121 that includes a camera 122 is connected to both robotic tool 110 and controller 160.

A calibration block 120 may be utilized by vision based robotic system 100 for calibration purposes. Calibration block 120 may include a plurality of camera reading points 130 and at least one or more sets of optical sensors. Only one optical sensor is shown that includes an optical beam transmitter 140 and an optical beam receiver 142.

In FIG. 1, a cross-section of calibration block 120 is shown in order to illustrate how calibration pin 112 may extend through calibration block 120, in order to perform calibration of robotic tool 110 and machine vision assembly 121, as will be described in more detail hereinafter.

Each set of optical sensors of calibration block 120 include an optical beam transmitter 140 to transmit an optical beam 150 and an optical beam receiver 142 to receive the optical beam. In one embodiment, two sets of optical sensors are in alignment with one another such that the transmitted optical beams intersect at a center point, as will be described in more detail hereinafter.

Controller 160 coupled to servo motor assembly 116 and machine vision assembly 121 performs various operations to move calibration pin 112 within calibration block 120 in order to determine a calibration pin center position relative to robotic tool 110 by determining a position at which point calibration pin 112 intersects the transmitted optical beams 150 of the calibration block 120 and further performs various operations to determine a camera center position based upon capturing images of the camera reading points 130 of calibration block 120. Controller 160 then calculates a camera to tool offset value by determining the difference between the camera center position and the calibration pin center position.

In particular, controller 160 commands servo motor assembly 116 to move calibration pin 112 to the center point of the transmitted optical beams 150 of calibration block 120 in order to determine a calibration pin center position relative to robotic tool 110. Further, controller 160 commands camera 112 to capture an image of various camera reading points 130 of calibration block 120 in order to determine a camera center position. In one embodiment, two sets of optical sensors are in perpendicular alignment with one another such that the transmitted optical beams 150 intersect at a center point. It should be noted that in FIG. 1, only one optical sensor including optical beam transmitter 140 and optical beam receiver 142 is shown.

Controller 160 calculates the camera to tool offset value by calculating the difference between the camera center position and the calibration pin center position. In essence, as will be described in more detail hereinafter, the camera to tool offset value is an offset value between the axis of the camera 122 and the axis of the calibration pin 112 designating the axis of robotic tool 112. After calibration, a gripper or a tool will be located where the calibration pin is and the calibration offset value provides an efficient way of calibrating the camera to tool offset value for automatic device manufacturing. Further, although a calibration pin is used for calibration in this embodiment, it should be appreciated that a wide variety of different types of devices, structures, and mechanisms may be used instead of the calibration pin.

In one embodiment, robotic tool 110 may be an end effector such as a gripper. For example, the gripper may be a vacuum gripper, a two jaw gripper, a three jaw gripper, etc. However, robotic tool 110 may be an other type of robotic tool as well, such as, a screwdriver, welder, vacuum head, or other well known type of robotic tools.

In one particular embodiment, robotic tool 110 may be utilized as a pick and place station to engage a workpiece and to store the workpiece to a selected portion of a device. Controller 160 may be operable to control servo motor assembly 116 to move robotic tool 110 to: align the workpiece to the selected portion of a device based upon a captured image of the portion of the device from camera 122 of machine vision assembly 121 and may utilize the camera tool offset value to place the aligned workpiece onto or into the selected portion of the device with a high degree of accuracy.

Figure 2:
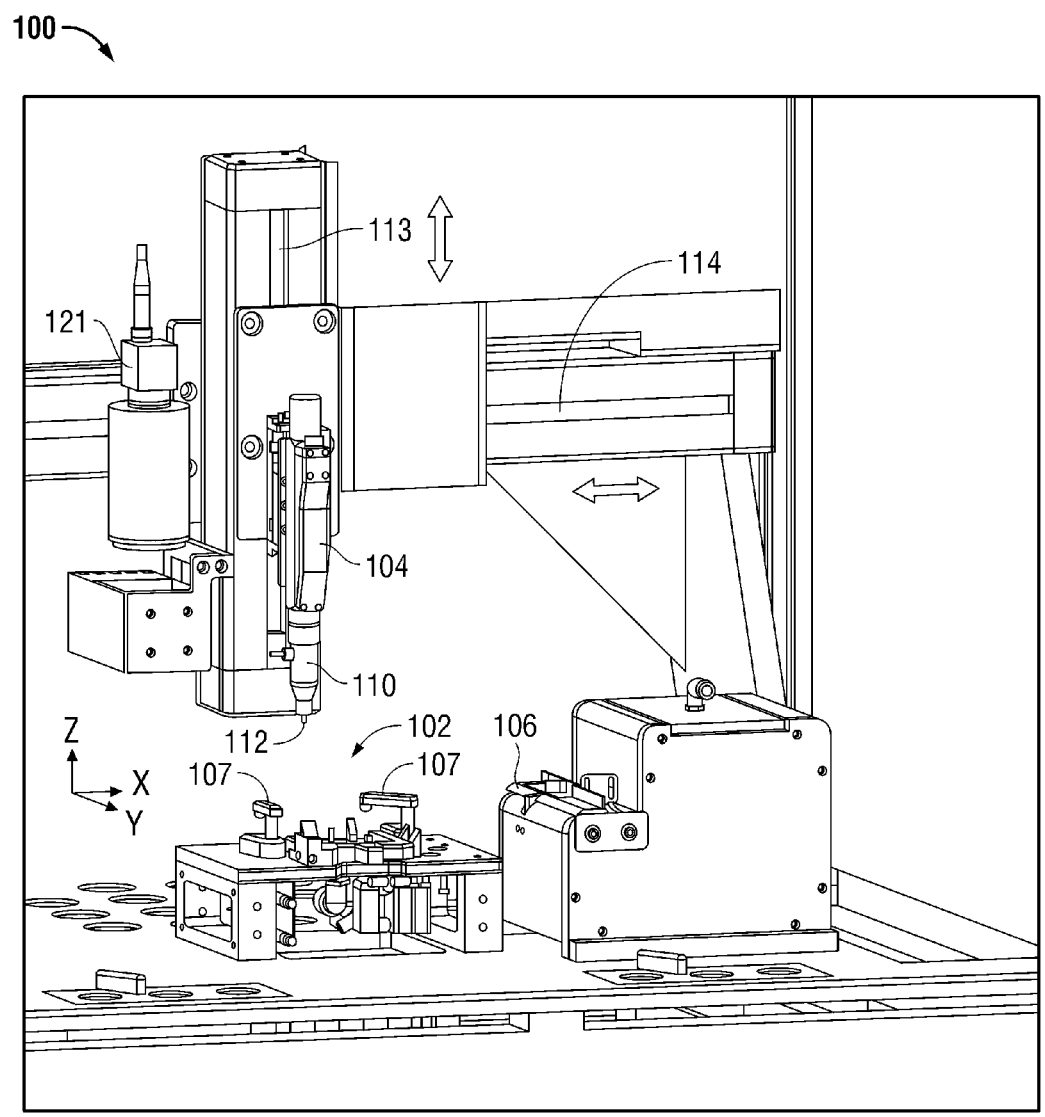
FIG. 2 illustrates a robotic system that may be utilized for picking and placing workpieces into disk drives after calibration, according to one embodiment of the invention.

With reference to FIG. 2, FIG. 2 illustrates a robotic system 100 that may be utilized for picking and placing workpieces into disk drives after calibration, according to one embodiment of the invention. In this example, after calibration, the workpieces that may be picked and placed into a disk drive may include head stack assemblies, ramps, disks, screws, fasteners, etc.

In this embodiment, robotic tool 110 may be a gripper such as a vacuum gripper or a three jaw gripper that may first be calibrated, as previously described, and robotic tool 110 may thereafter be used to pick and place workpieces to a disk drive.

In this embodiment, robotic tool 110 may be coupled to a position gantry that enables robotic tool 110 to be selectively moved along the x, y, and z axis. As shown, the position gantry may include a servo motor assembly that may include one or more servo motors and a high resolution encoder coupled thereto. The servo motor(s) and the high resolution encoder may be coupled to a Programmable Logic Controller (PLC) to control the motion and position of robotic tool 110.

The position gantry may include a rail assembly 113 that enables robotic tool 110 to be moved along the z axis (up and down in view of FIG. 2), a rail assembly 114 that enables robotic tool 110 to be moved along the x axis (left and right in view of FIG. 2) and a rail assembly (not particularly shown) that enables robotic tool 110 to be moved along the y axis (into and out of the page in view of FIG. 2)

Robotic tool 110 may be directly mounted on the rail assembly such that robotic tool 110 may be moved along the x, y, and z axis. Further, another robotic tool 104 may also be mounted to robotic tool 110. For example, additional robotic tool 104 may be another type of end effector such as a welder, screwdriver, vacuum head, or other type of gripper.

Although the embodiment of FIG. 2 is drawn to a robotic tool including a gripper 110 with pick and place functionality, it should be appreciated that embodiment of the invention may be directed to any type of robotic tool system that may be calibrated according to the calibration features as will be hereinafter discussed.

The example of FIG. 2 is directed to a robotic tool system for disk drive assembly. In this example, an operator may clamp a hard disk drive being manufactured onto a registration nest, such as shown at 102. Registration nest 102 may include one or more clamps 107 for clamping the disk drive (not shown) onto the registration nest 102. As soon as the disk drive under manufacture is clamped onto the registration nest 102, robotic tool 110 may assist in pick and place operations as well as assembly operations.

In particular, robotic tool 110 may be a vacuum gripper or a three jaw gripper. Robotic tool 110 may be utilized as a pick and place station to engage a workpiece and to store the workpiece to a selected portion of the disk drive. Controller 160 may be operable to control servo motor assembly 116 to move robotic tool 110 to align the workpiece previously selected from presenting assembly 106. For example, presenting assembly 106 may store such items as head stack assemblies, ramps, disks, etc. Controller 160 operable to control the servo motor assembly 116 may move robotic tool 110 to align the workpiece to a selected portion of the disk based upon a captured image of the selected portion of the disk drive from the machine vision assembly 121 and based upon the camera tool offset value may place the aligned workpiece onto or into a selected portion of the disk drive.

The operation of the robotic tool 110 and its movement on the positioning gantry may be controlled by a programmable logic controller (PLC)-based controller 160. The PLC-based controller 160 may be coupled to the servo motor assembly 116 and the machine vision assembly 121 and the controller may be operable to: command the servo motor assembly to move the calibration pin 112 to the center point of the transmitted optical beams of the calibration block; determine a calibration pin center position relative to the robotic tool 110; and command the camera of the machine vision assembly to capture an image of the plurality of camera reading points of the calibration block and to determine a camera center position, as will be described in more detail hereinafter.

In this embodiment, after calibration and after the hard disk drive is placed on the registration nest 102, the controller 160 may command the robotic tool 110 to place workpieces from presenting assembly 106 onto the disk drive as well as to perform such functions as attaching the workpieces to the disk drive.

Although controller 160 may be implemented as a programmable logic controller, it should be understood by those of skill in the art that any suitable controller or processor may implement the functionality described herein. Indeed, the controller may comprise a plurality of microprocessors and controllers working to perform the desired functions. In one embodiment, the controller may comprise a microprocessor executing instructions, the instructions being operable to cause the microprocessor to perform the steps described herein. The instructions may be stored in any computable readable medium. In one embodiment, they may be stored on a non-volatile semiconductor memory external to the microprocessor or integrated in the microprocessor. In another embodiment, the instructions may be stored on a disk and read into a volatile semiconductor memory before execution by the microprocessor. In yet another embodiment, the controller comprises suitable logic circuitry, such as state machine circuitry.

According to one embodiment of the invention, robotic system 100 may be provided with machine vision capabilities, which reduces the chances of operator errors such as scraping errors and may prevent or at least significantly reduce particle contamination. Robotic system 100 may include a machine vision assembly 121.

In particular, machine vision assembly 121 may be operable to take images of the calibration block by commanding camera 122 to capture an image of each of the plurality of camera reading points and to determine a camera center position. Machine vision assembly 121 may also be operable to assist in picking and placing workpieces and assembling such workpieces to the disk drive.

Any suitable machine vision assembly may be used. For example, a machine vision assembly from Adept Technology, Inc. of Livermore, Calif. may be used. The machine vision assembly may include, for example, a high resolution black and white progressive scan CCD (Charge Coupled Device) video camera such as the XC-HR70 available from Sony Corporation. Other video cameras may also be used and the optics thereof adapted to the specific requirements of the implementation at hand.

Figure 3:
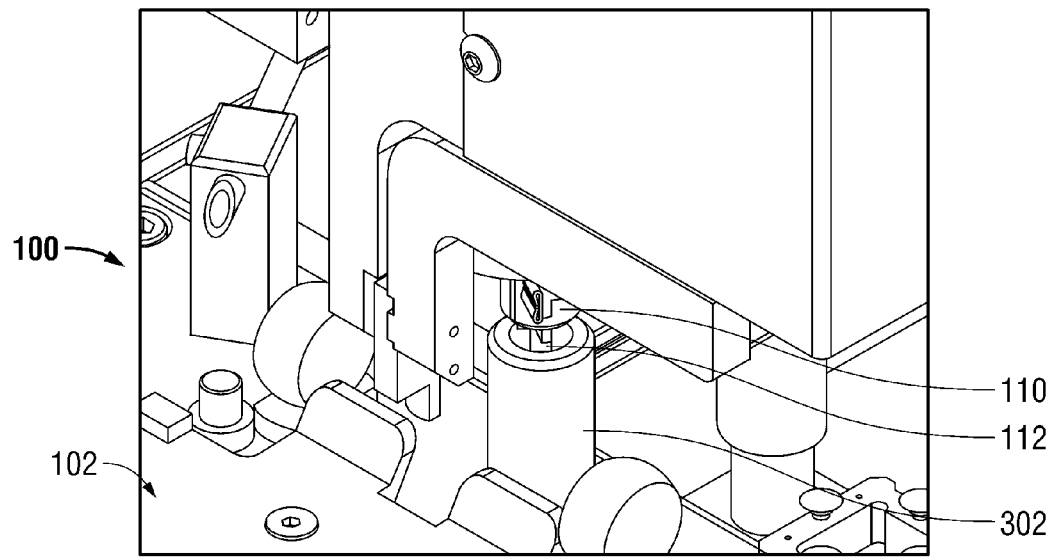
FIG. 3 is a close-up perspective view of a robotic system, according to one embodiment of the invention.

Turning now to FIG. 3, FIG. 3 shows a close-up perspective view of robotic system 100 according to one embodiment of the invention. In particular, FIG. 3 shows robotic tool 110 gripping calibration pin 112 from a cylindrical calibration pin holder 302. Thus, robotic tool 110 engages calibration pin 112 from cylindrical calibration pin holder 302.

Figure 4:
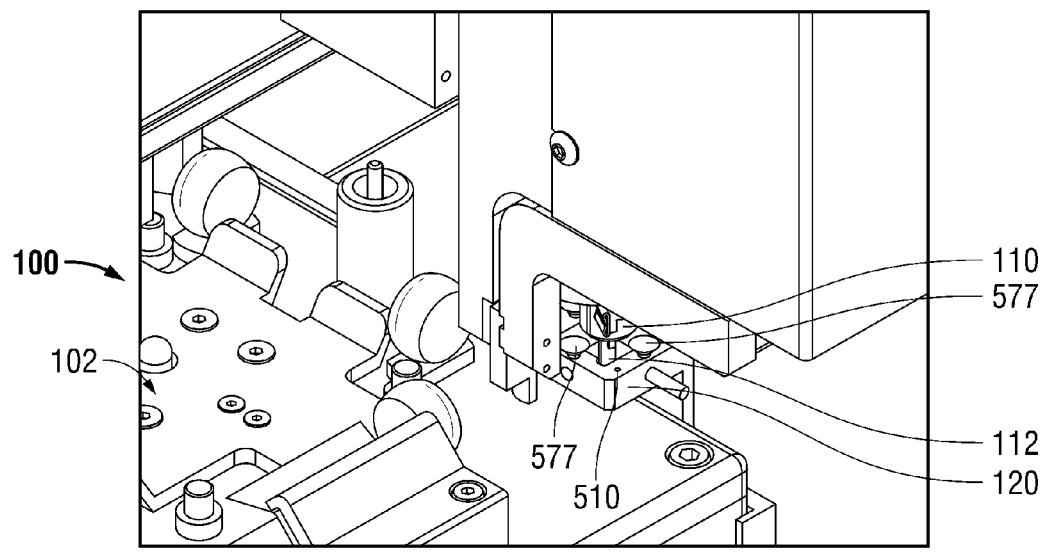
FIG. 4 is a close-up perspective view of a robotic system in which a calibration pin has been moved to a center point of a calibration block, according to one embodiment of the invention.

With reference now to FIG. 4, FIG. 4 shows a close-up perspective view of robotic system 100 in which the controller coupled to the servo motor assembly has commanded the servo motor assembly to move calibration pin 112 to the center point of the transmitted optical beams of the calibration block 120, according to one embodiment of the invention.

As previously described, controller 160 determines a calibration pin center position relative to robotic tool 110 by moving calibration pin 112 to the center point of transmitted optical beams of calibration block 120 and commands the camera 122 of machine vision assembly 121 to capture an image of a plurality of camera reading points 510 to determine a camera center position. As can be seen in FIG. 4, calibration block 120 is mounted into robotic system 100.

Figure 5A:
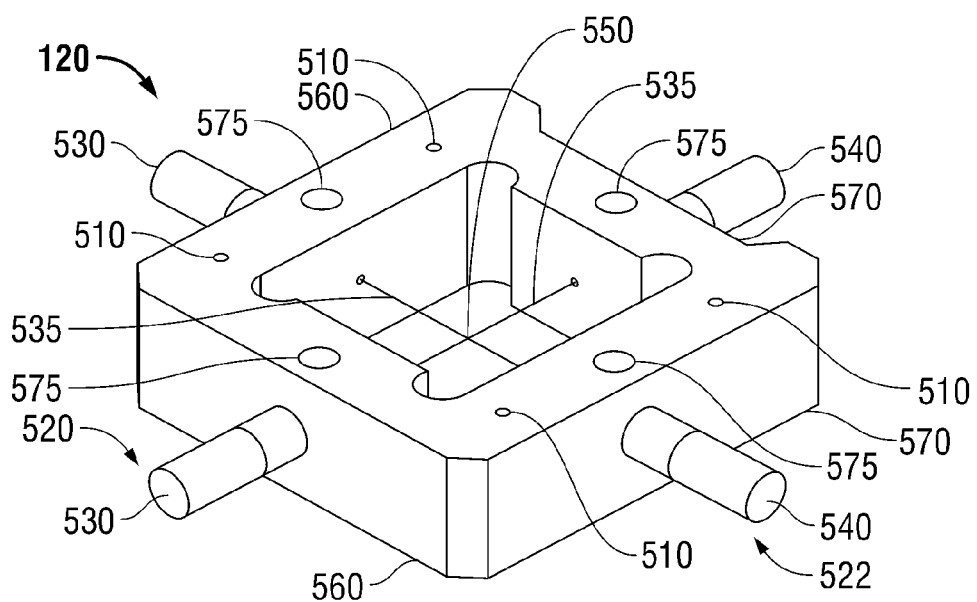
FIG. 5A is a perspective view of a calibration block, according to one embodiment of the invention.

Moving now to FIG. 5A, FIG. 5A is a perspective view of calibration block 120, according to one embodiment of the invention. In this embodiment, calibration block 120 includes a plurality of camera reading points 510 and at least two sets of optical sensors 520 and 522. Each set of optical sensors 520 and 522 includes an optical beam transmitter 530 to transmit an optical beam 535 and an optical beam receiver 540 to receive the optical beam 535. The two sets of optical sensors 520 and 522 are in alignment with one another such that the transmitted optical beams 535 intersect at a center point 550. In one embodiment, the two sets of optical sensors 520 and 522 are in perpendicular alignment with one another such that the transmitted optical beams 535 intersect at a center point.

As can be seen in this embodiment, calibration block 120 is approximately square-shaped with the optical beam transmitters 530 and the optical beams receiver 540 being mounted on opposing sides 560 and 570, respectively. Further, in this embodiment, the plurality of camera reading points include four holes 510 drilled into the top of calibration block 120 that are aligned with the two sets of optical sensors 520 and 522, respectively.

As will be described in more detail hereinafter, the camera center position may be calculated by capturing an image of each of the four holes 510 to form a square in order to calculate a center of the square corresponding to the camera center position.

Further, as can be seen in FIG. 5A, each of the sides 570 of the square-shape calibration block 120 include screw holes 575 that may receive screws 577 (see FIG. 4) to mount the optical beam transmitters 530 and optical beam transmitters 540, respectively, to the calibration block.

It should be appreciated that the square-shaped embodiment of calibration block 120 is only one type of shape that may be utilized. For example, rectangular shapes, circular shapes, or any type of geometric shape may be utilized. In particular, any type of geometric shape that can transmit and receive optical beams to form a center point may be utilized. Further, any geometric shape may be utilized that allows for a camera center position to be calculated based upon captured images of camera reading points such that a center of the geometric arrangement may be calculated.

Figure 5B:
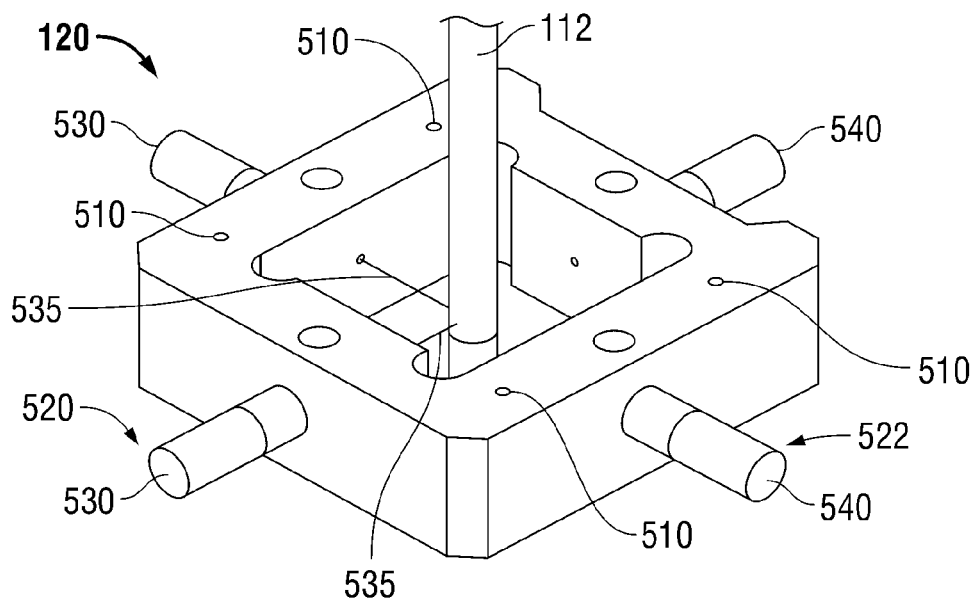
FIG. 5B is a perspective view of a calibration block in which a calibration pin crosses through the center point of transmitted optical beams, according to one embodiment of the invention.

With reference now to FIG. 5B, a perspective view of calibration block 120 is shown in which calibration pin 112 crosses through the center point of the transmitted optical beams 535, according to one embodiment of the invention. In particular, controller 160 commands the servo motor assembly to move calibration pin 112 to the center point of the transmitted optical beam 535 of calibration block 120. Based upon this, controller 160 can determine a calibration pin center position relative to robotic tool 110.

Further, controller 160 commands camera 122 to capture an image of each camera reading point 510 to determine a camera center position. Although, in one embodiment, the camera reading points are merely four circular holes 510 in the calibration block, it should be appreciated that other types of camera reading points may be utilized such as differently shaped holes (e.g., square, rectangular, etc.) or a wide variety of differently shaped protrusions from the calibration block may be utilized. In essence, any type of camera reading point may be utilized that can be captured in an image from the camera to calculate a camera center position.

Figure 6:
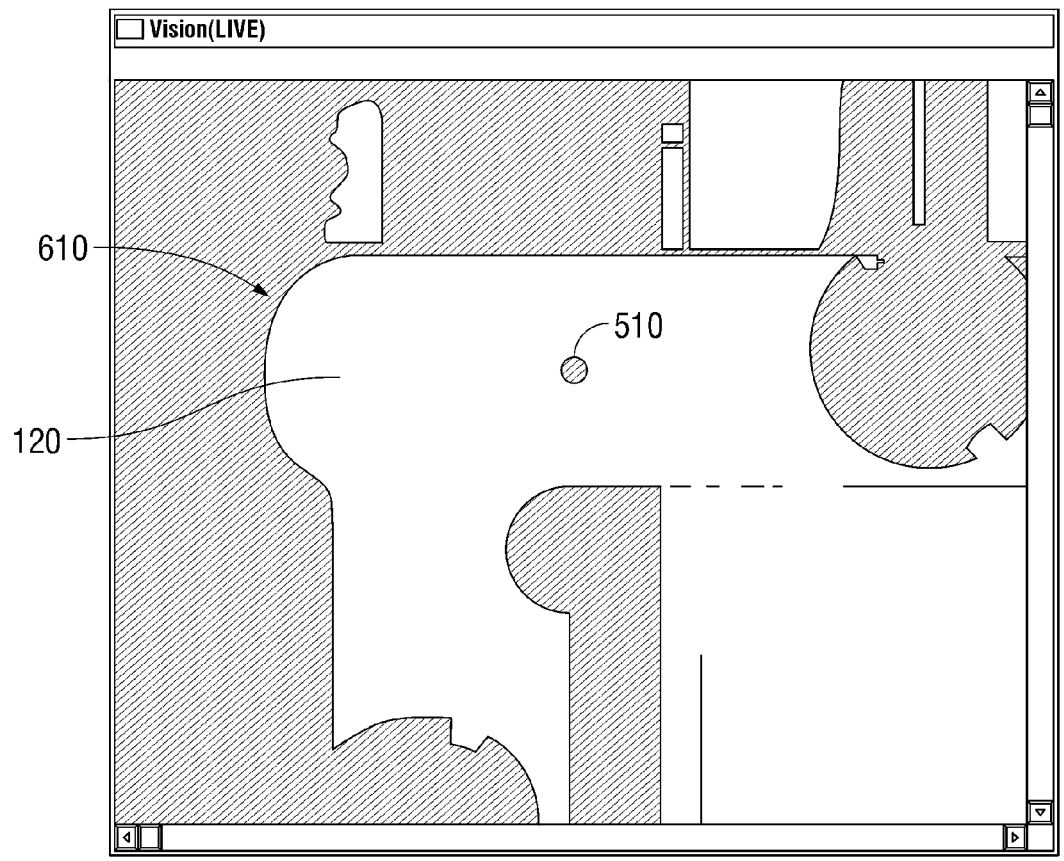
FIG. 6 is a diagram illustrating computer-based version of an image taken by a camera of a camera reading point of a calibration block, according to one embodiment of the invention.

Turning now to FIG. 6, FIG. 6 illustrates computer-based version of an image 610 taken by the camera 122 of the machine vision assembly 121 of a camera reading point 510 of calibration block 120, according to one embodiment of the invention. In this embodiment, each hole 510 of calibration block 120 is utilized to generate a camera center position. In particular, controller 160 commands camera 122 to capture an image of each hole 510 of calibration block 120 to determine a camera center position.

In particular, in this embodiment, the camera center position is calculated by capturing an image of each of the four holes 510 of calibration block 120 to form a square and from that controller 160 calculates a center of the square as the camera center position, as will be described in more detail hereinafter. Further, controller 160 includes a pixel to distance calibration to calculate the camera center position in terms of distance comparable to the calibration center position of the robotic tool. The camera to tool offset value may be calculated as the difference between the camera center position and the calibration pin center position.

Figure 7:
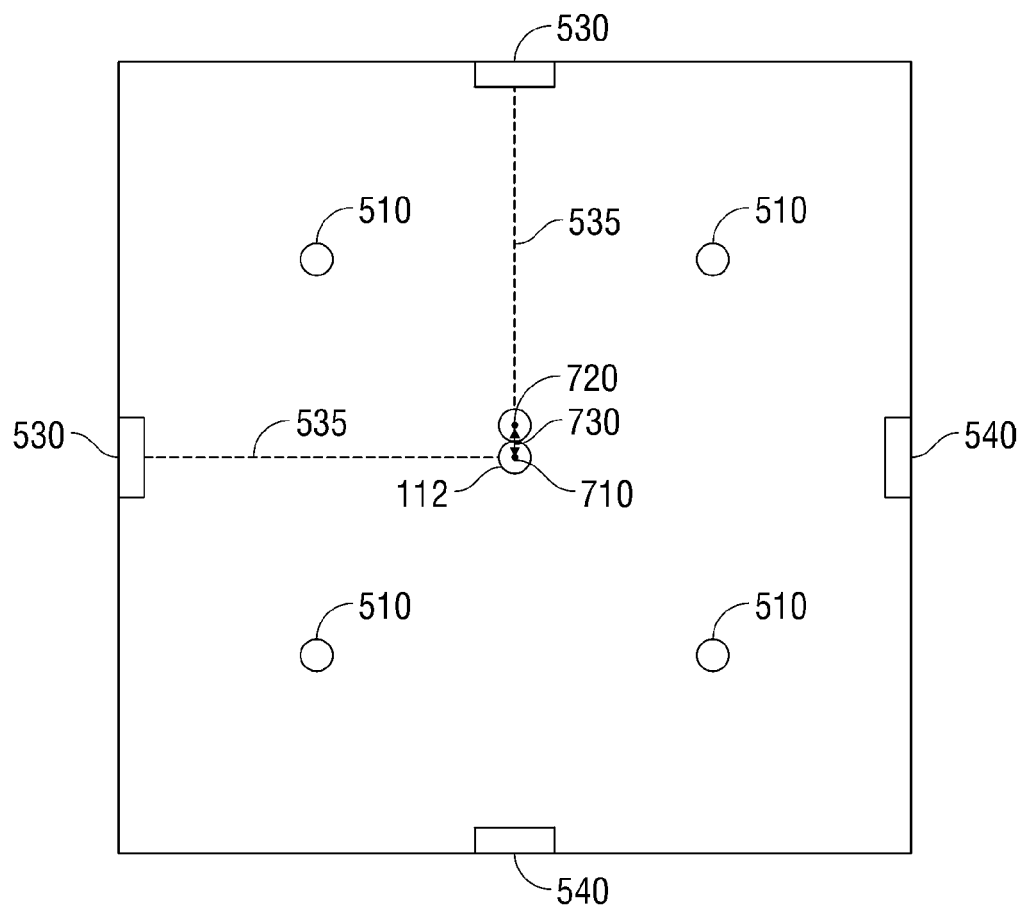
FIG. 7 is a diagram illustrating a calibration pin center position and a camera center position that may be utilized to determine a camera to tool offset value, according to one embodiment of the invention.

With reference now to FIG. 7, FIG. 7 is a diagram illustrating a calibration pin center position 710 and a camera center position 720 that may be utilized to determine a camera to tool offset value 730, according to one embodiment of the invention. In particular, as previously described, controller 160 commands servo motor assembly 116 to move calibration pin 112 to the center point of optical beams 535 transmitted by the optical beam transmitters 530 to determine a calibration pin center position 710 relative to robotic tool 110. Further, controller 160 commands camera 122 of machine vision assembly 121 to capture an image of each of the four holes 510 of the calibration block 120 in order to form a square and calculate a center of the square which corresponds to a camera center position 720.

Based upon the calibration pin center position 710 and the camera center position 720, controller 160 may determine a camera to tool offset value 730, in which the camera to tool offset value 730 is calculated as the difference between the camera center position 720 and the calibration pin center position 710. As shown in FIG. 7, this difference value can be seen as camera to tool offset value 730.

Thus, the calibration of the robotic system is based upon the camera to tool offset value which is the offset difference between the axis of the camera and the axis of the robotic tool. The axis of the robotic tool may be referred to as the tool center point. Thus, a relationship between the tool center point and the downward camera is determined and is represented by the difference value 730.

This difference value 730 can then be utilized by controller 160 to accurately utilize robotic tool 110 for picking and placing workpieces, such as head stack assemblies, ramps, and disks, to a disk drive, based upon captured images of the selected portion of the disk drives from the camera to which workpieces are to be placed or assembled and utilizing the camera to tool offset value to accurately place or assemble the workpiece onto or into the selected portion of the disk drive.

By calibrating robotic tool 110 utilizing a pair of crossed beam fiber optic sensors 520 aligned by a precisely machined calibration block 120 and by a camera also calibrated by the precisely machined calibration block, robotic tool 110 may very accurately pick and place head stack assemblies and other items to a disk drive and very accurately assemble these items on the disk drive.

Further, these methods and techniques for utilizing these calibration techniques provide an efficient calibration process that does not require human intervention for achieving a highly accurate camera to tool offset value which may be utilized by the robotic system for picking, aligning, and assembling disk drive workpieces to a disk drive in a very precise manner.

An operator or technician may simply utilize a "one-button click" to instruct controller 160 to determine the camera to tool offset value in order to efficiently calibrate the robotic tool 110 without the use of operator intervention. The robotic tool may be calibrated either during the first time the robotic system is turned on or during any change or repair of parts.

Calibration block 120 may have precise machine features to accommodate the two pairs of cross beamed fiber optic sensors 520 (optical transmitters 530 and optical receivers 540). In one embodiment, each sensor may be placed in a perpendicular relationship to each other so that a "+" formation is formed, as previously described. Thus, robotic tool 110 may utilize a calibration pin 112 to cut the fiber optic beams 535, as previously described, to calculate the center of tooling. Additionally, calibration block 120 having, in one embodiment, fine drilled holes 510 at four corners may allow machine vision assembly 121 with camera 122 to take images to calculate a very accurate axis of the camera to determine a very accurate offset value with respect to the axis of the robotic tool in world coordinates.

As previously described, utilizing these very detailed determinations of the calibration pin center position and the camera center position, a highly accurate camera to tool offset value may be determined for use in pick and place functionality as well as assembly functionality utilizing the robotic tool.

In particular, based upon this highly accurate calibration determination utilizing the camera to tool offset value, the robotic tool may utilize a gripper to perform pick and place operations for workpieces, such as, head stack assemblies, ramps, disks, etc., to a disk drive, and also such that they can be assembled by a robotic tool.

By utilizing the calibrated vision based robotic system and methods previously described, many human errors involved in disk drive manufacturing by robotic systems may be reduced resulting in a reduction of disk drive contamination. Also, because the controller automatically calibrates the robotic tool, previously required time consuming human based calibration is eliminated, thus, reducing the time required for disk drive manufacturing. Further, the overall amount of time for disk drive manufacturing is reduced by the improved accuracy of the calibrated vision based robotic system. Accordingly, disk drives may be manufactured in a more accurate and time reduced fashion.

It should be appreciated by those with skill in this art that, although embodiments of the invention have been previously described with reference to particular robotic device components, that the embodiments of the invention may be utilized with a wide variety of differing types of robotic devices having different types of robotic tools, calibration devices, machine vision assemblies, workpieces, and manufactured devices, and that the details disclosed in describing the embodiments of the invention are not intended to limit the scope of the invention as set forth in the appended claims.

What is claimed is:

1. A method of calibrating a vision based robotic system comprising:
   engaging a calibration pin with a robotic tool;
   moving the calibration pin to a calibration block, the calibration block including at least one set of optical sensors having an optical beam transmitter to transmit an optical beam and an optical beam receiver to receive the optical beam, wherein the transmitted optical beam includes a center point;
   moving the calibration pin to the center point of the transmitted optical beam of the calibration block;
   determining, at a processor, a calibration pin center position relative to the robotic tool; and
   commanding, by the processor, a machine vision assembly having a camera to capture an image of a plurality of camera reading points of the calibration block and to determine a camera center position.

2. The method of claim 1, wherein the at least one set of optical sensors are in perpendicular alignment with one another such that the transmitted optical beam intersects at a center point.

3. The method of claim 1, further comprising calculating a camera to tool offset value, the camera to tool offset value being calculated as the difference between the camera center position and the calibration pin center position.

4. The method of claim 3, wherein the camera center position includes a pixel to distance calibration.

5. The method of claim 3, wherein the camera center position is calculated by forming a geometric arrangement from the captured images of the camera reading points and calculating a center of the geometric arrangement.

6. The method of claim 3, wherein the plurality of camera reading points include four holes on the calibration block that are aligned with the two sets of optical sensors, respectively, and the camera center position is calculated by capturing an image of each of the four holes to form a square and calculating a center of the square.

7. The method of claim 3, wherein the robotic tool is one of a vacuum gripper or a three jaw gripper.

8. The method of claim 3, further comprising:
utilizing the robotic tool as a pick and place station to engage a workpiece and to store the workpiece to a selected portion of a device;
aligning the workpiece with the robotic tool to the selected portion of the device based upon a captured image of the selected portion of the device from the machine vision assembly and the camera to tool offset value; and
moving the robotic tool to the device to place the aligned workpiece onto or into the selected portion of the device.

9. The method of claim 8, wherein the device is a disk drive.

10. The method of claim 8, wherein the workpiece is one of a head stack assembly, a ramp, or a disk.

11. A calibrated vision based robotic system comprising:
a robotic tool to engage a calibration pin;
a servo motor assembly configured to move the robotic tool;
a machine vision assembly including a camera;
a calibration block including a plurality of camera reading points and at least two sets of optical sensors, each set of optical sensors comprising an optical beam transmitter to transmit an optical beam and an optical beam receiver to receive the optical beam, wherein the two sets of optical sensors are in alignment with one another such that the transmitted optical beams intersect at a center point; and
a controller coupled to the servo motor assembly and the machine vision assembly, the controller operable to:
command the servo motor assembly to move the calibration pin to the center point of the transmitted optical beams of the calibration block;
determine a calibration pin center position relative to the robotic tool; and
command the camera to capture an image of the plurality of camera reading points and to determine a camera center position.

12. The robotic system of claim 11, wherein the two sets of optical sensors are in perpendicular alignment with one another such that the transmitted optical beams intersect at a center point.

13. The robotic system of claim 11, wherein the controller further calculates a camera to tool offset value, the camera to tool offset value being calculated as the difference between the camera center position and the calibration pin center position.

14. The robotic system of claim 13, wherein the camera center position includes a pixel to distance calibration.

15. The robotic system of claim 13, wherein the camera center position is calculated by forming a geometric arrangement from the captured images of the camera reading points and calculating a center of the geometric arrangement.

16. The robotic system of claim 13, wherein the plurality of camera reading points include four holes on the calibration block that are aligned with the two sets of optical sensors, respectively, and the camera center position is calculated by capturing an image of each of the four holes to form a square and calculating a center of the square.

17. The robotic system of claim 13, wherein the robotic tool is one of a vacuum gripper or a three jaw gripper.

18. The robotic system of claim 13, wherein the robotic tool is utilized as a pick and place station to engage a workpiece and to store the workpiece to a selected portion of a device, the controller operable to control the servo motor assembly to move the robotic tool to: align the workpiece to the selected portion of the device based upon a captured image of the selected portion of the device from the machine vision assembly and the camera tool offset value and place the aligned workpiece onto or into the selected portion of the device.

19. The robotic system of claim 18, wherein the device is a disk drive.

20. The robotic system of claim 18, wherein the workpiece is one of a head stack assembly, a ramp, or a disk.

21. A calibrated vision based robotic system comprising:
a robotic tool to engage a calibration pin;
a servo motor assembly configured to move the robotic tool;
a machine vision assembly including a camera;
a calibration block including a plurality of camera reading points and at least two sets of optical sensors, each set of optical sensors comprising an optical beam transmitter to transmit an optical beam and an optical beam receiver to receive the optical beam, wherein the two sets of optical sensors are in perpendicular alignment with one another such that the transmitted optical beams intersect at a center point, and wherein the plurality of camera reading points include four holes on the calibration block that are aligned with the two sets of optical sensors; and
a controller coupled to the servo motor assembly and the machine vision assembly, the controller operable to:
command the servo motor assembly to move the calibration pin to the center point of the transmitted optical beams of the calibration block;
determine a calibration pin center position relative to the robotic tool; and
command the camera to capture an image of the plurality of camera reading points and to determine a camera center position, wherein the camera center position includes a pixel to distance calibration; and
calculate a camera to tool offset value, the camera to tool offset value being calculated as the difference between the camera center position and the calibration pin center position;
wherein the robotic tool is further utilized as a pick and place station to engage a workpiece and to store the workpiece to a selected portion of a device based upon a captured image of the selected portion of the device by the machine vision assembly and the camera tool offset value.

22. The robotic system of claim 21, wherein the camera center position is calculated by capturing an image of each of the four holes to form a square and calculating a center of the square.

23. The robotic system of claim 21, wherein the robotic tool is one of a vacuum gripper or a three jaw gripper.

24. The robotic system of claim 21, wherein, the controller is operable to control the servo motor assembly to move the robotic tool to: align the workpiece to the selected portion of the device based upon a captured image of the selected portion of the device from the machine vision assembly and the camera tool offset value and place the aligned workpiece onto or into the selected portion of the device.

25. The robotic system of claim 24, wherein the device is a disk drive.

26. The robotic system of claim 24, wherein the workpiece is one of a head stack assembly, a ramp, or a disk.

* * * * *